United States Patent
Shih

(10) Patent No.: US 7,095,537 B2
(45) Date of Patent: Aug. 22, 2006

(54) METHOD AND SYSTEM FOR OPTICAL COUPLING USING HOLOGRAPHIC RECORDING MEDIA

(75) Inventor: Min-Yi Shih, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 11 days.

(21) Appl. No.: 10/452,483

(22) Filed: May 30, 2003

(65) Prior Publication Data

US 2004/0240014 A1 Dec. 2, 2004

(51) Int. Cl.
*G02B 5/32* (2006.01)

(52) U.S. Cl. .............................. 359/15; 359/34; 385/37; 385/49

(58) Field of Classification Search ................. 359/34, 359/15, 35; 385/49, 37
See application file for complete search history.

(56) References Cited

U.S. PATENT DOCUMENTS

| | | | |
|---|---|---|---|
| 3,809,455 A | 5/1974 | Pekau et al. | |
| 3,864,016 A * | 2/1975 | Dakss et al. | 385/49 |
| 3,885,856 A | 5/1975 | Ostrowsky et al. | |
| 4,057,319 A | 11/1977 | Ash et al. | |
| 4,398,792 A | 8/1983 | Horner et al. | |
| 4,907,851 A * | 3/1990 | Marhic | 385/24 |
| 4,952,010 A | 8/1990 | Healey et al. | |
| 5,011,255 A | 4/1991 | Bowen et al. | |
| 5,056,039 A | 10/1991 | Caulfield | |
| 5,515,462 A | 5/1996 | Huang et al. | |
| 6,542,264 B1 | 4/2003 | Agranat et al. | |
| 6,661,940 B1 * | 12/2003 | Kim | 385/15 |
| 2001/0028484 A1 * | 10/2001 | Sasaki et al. | 359/19 |

* cited by examiner

*Primary Examiner*—Leonidas Boutsikaris
(74) *Attorney, Agent, or Firm*—Fletcher Yoder

(57) ABSTRACT

A method for optical coupling comprises: includes providing a holographic recording media fixed relative to at least two optical elements; creating a hologram by transmitting light from each of the optical elements to the recording media; and transmitting light from a sending element of the optical elements through the recording media to a receiving element of the optical elements. Other variations include a system comprising at least two optical elements situated on one side of the recording media and an optical detector situated on an opposite side for detecting light transmitted through the opposite side; and a system comprising at least three optical elements situated on one side of the recording media, a beam splitter, and optical pump/control beams configured for transmitting an optical pump/control beam to the beam splitter and the opposite side so as to control transmission of an optical signal.

30 Claims, 8 Drawing Sheets

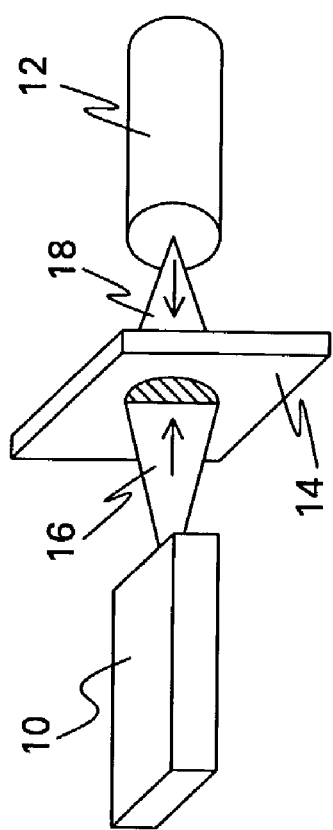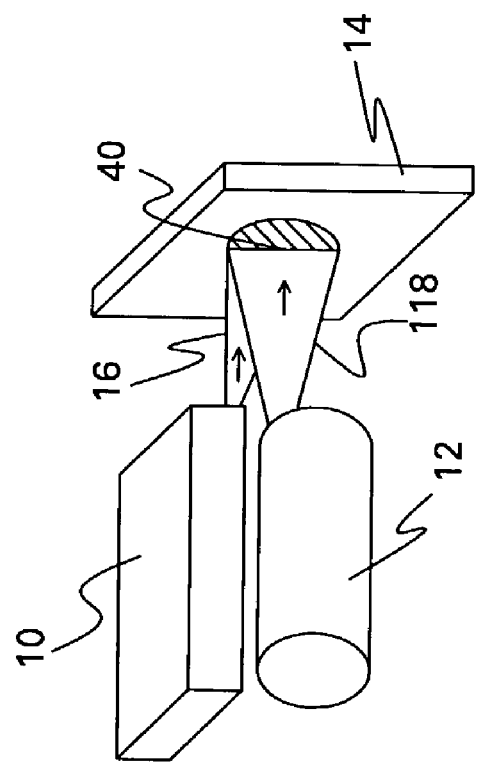

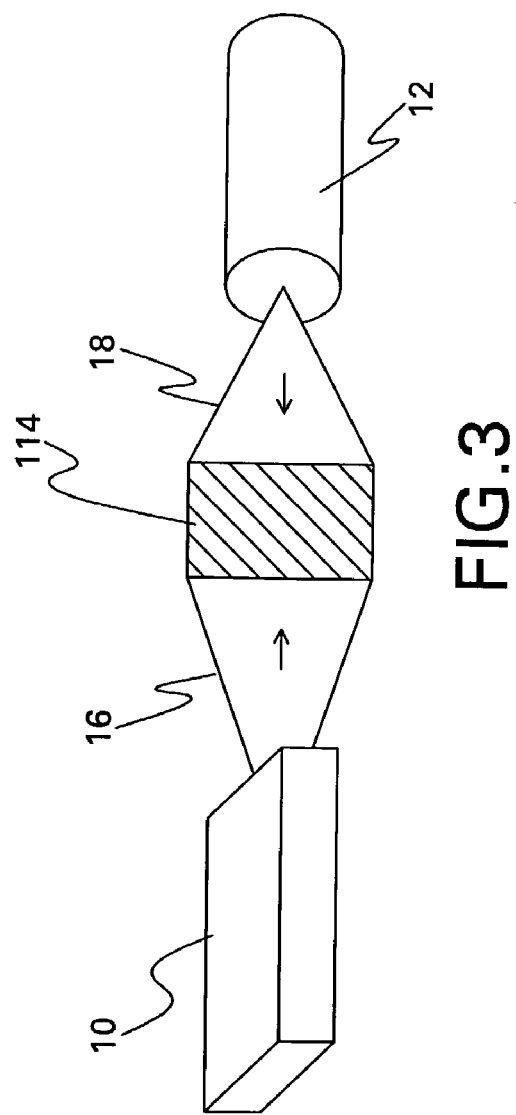
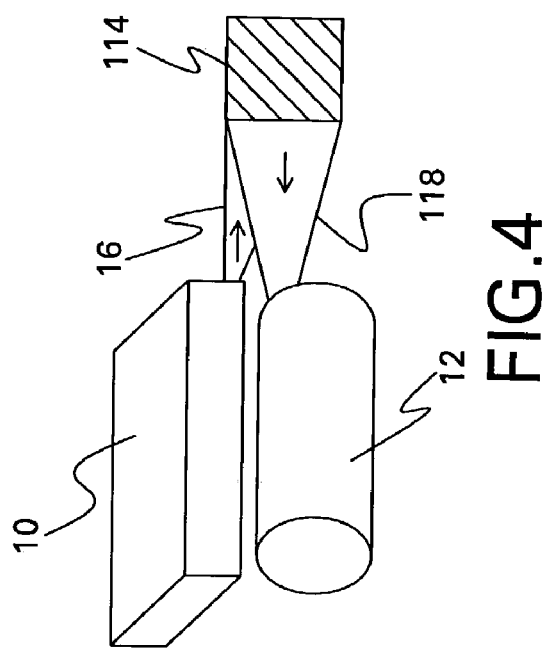

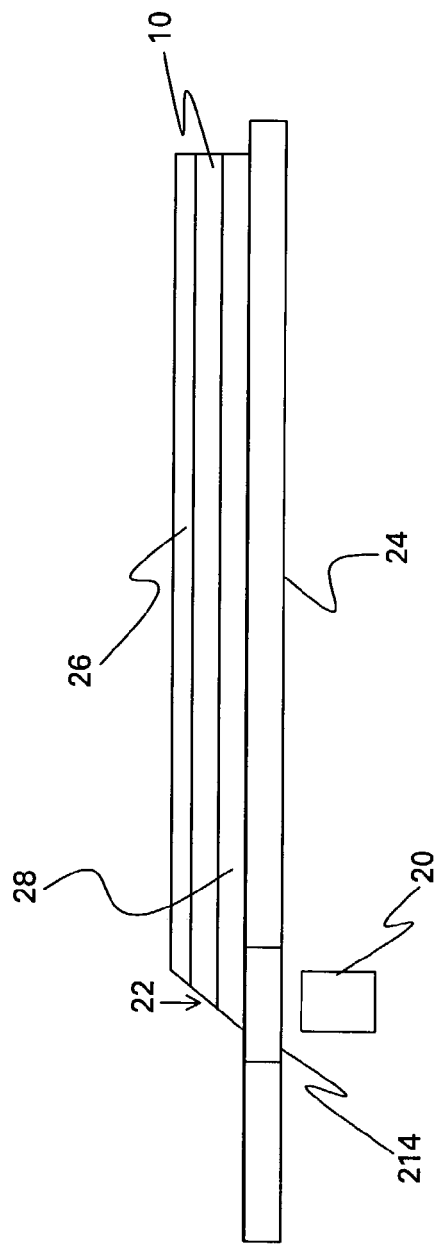
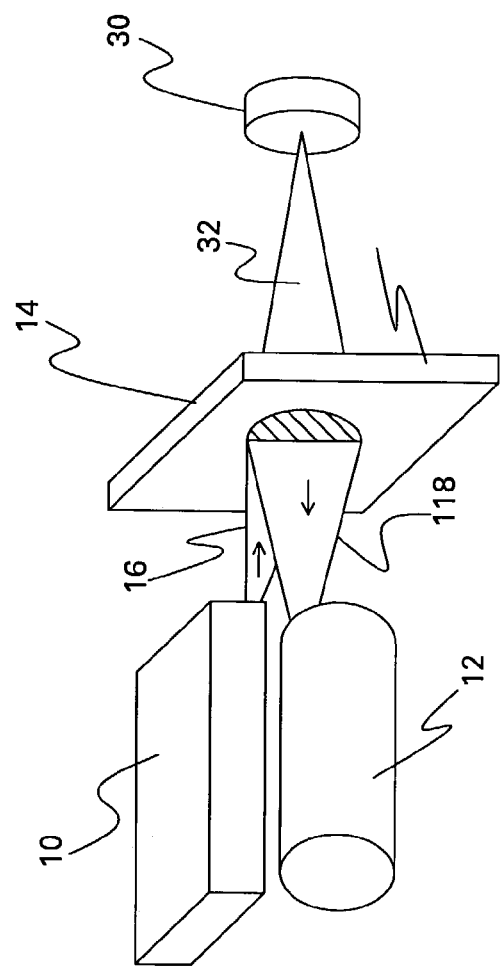

METHOD AND SYSTEM FOR OPTICAL COUPLING USING HOLOGRAPHIC RECORDING MEDIA

BACKGROUND

The invention relates generally to optical coupling.

When coupling light between optical elements such as emitters, detectors, waveguides, and fibers, for example, complex specially designed optics and optical mode-couplers are typically used. Insertion loss typically results with less light passing through than is desired.

It would therefore be desirable to have a technique for simply yet efficiently coupling light between two optical elements such as waveguides, optical fibers, optical devices, or combinations thereof.

BRIEF DESCRIPTION

Briefly, in accordance with one embodiment of the present invention, a method for optical coupling includes providing a holographic recording media fixed relative to at least two optical elements; creating a (hereinafter meaning at least one) hologram by transmitting light from each of the at least two optical elements to the recording media; and transmitting light from a (hereinafter meaning at least one) sending element of the at least two optical elements through the recording media to a receiving element (hereinafter meaning at least one) of the at least two optical elements.

In accordance with another embodiment of the present invention, an optical coupling system includes a holographic recording media fixed relative to at least two optical elements, the recording media comprising a hologram fabricated by transmitting light from each of the at least two optical elements to the recording media.

In accordance with another embodiment of the present invention, an optical coupling system includes a substrate; a (hereinafter meaning at least one) waveguide supported by the substrate; an (hereinafter meaning at least one) optical device including an emitter or a detector; and a holographic recording media supported by the substrate and positioned between the waveguide and the optical device.

In accordance with another embodiment of the present invention, an optical coupling system includes a holographic recording media; at least two optical elements situated on one side of the recording media; and an (hereinafter meaning at least one) optical detector situated on an opposite side of the recording media for detecting light transmitted through the opposite side of the recording media while light is transmitted from a sending element of the at least two optical elements through the recording media to a receiving element of the at least two optical elements and a controller for in-situ monitoring the optical coupling using the detected light.

In accordance with another embodiment of the present invention, an optical coupling and switching system includes a holographic recording media; at least three optical elements situated on one side of the recording media; a (hereinafter meaning at least one) beam splitter situated relative to one of the at least three optical elements; and optical pumps configured for transmitting a (meaning at least one) control beam to the beam splitter and the opposite side of the recording media so as to switch on and off an optical signal between the one of the at least three optical elements and the others of the at least three optical elements.

DRAWINGS

These and other features, aspects, and advantages of the present invention will become better understood when the following detailed description is read with reference to the accompanying drawings in which like characters represent like parts throughout the drawings, wherein:

FIG. 1 is a perspective view of one embodiment of the present invention wherein a waveguide and an optical fiber are fixed on opposite sides of a thin film holographic recording media.

FIG. 2 is a perspective view of another embodiment of the present invention wherein a waveguide and an optical fiber are fixed on the same side of a thin film holographic recording media.

FIG. 3 is a perspective view of another embodiment of the present invention wherein a waveguide and an optical fiber are fixed on opposite sides of a volume holographic recording media.

FIG. 4 is a perspective view of another embodiment of the present invention wherein a waveguide and an optical fiber are fixed on the same side of a volume holographic recording media.

FIG. 5 is a side view of another embodiment of the present invention wherein a waveguide and an optical emitter are fixed on opposite sides of a holographic recording media.

FIG. 6 is a perspective view of another embodiment of the present invention which is similar to the embodiment of FIG. 2 with the addition of an optical detector on the opposite side of the holographic recording media.

DETAILED DESCRIPTION

Figure 7:
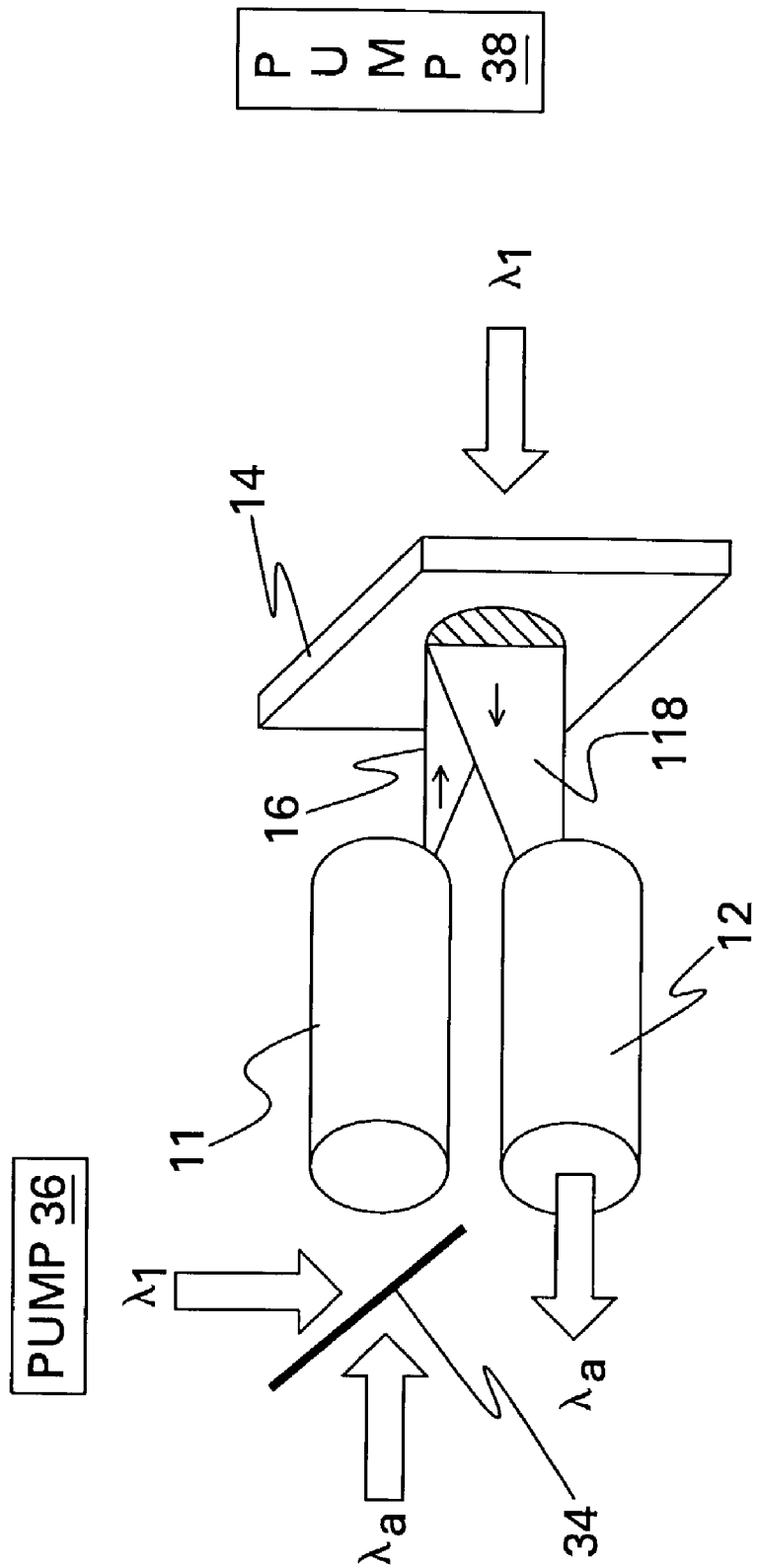
FIG. 7 is a perspective view of another embodiment of the present invention which is similar to the embodiment of FIG. 6 with the waveguide being replaced with an optical fiber and with the additions of a beam splitter and optical pumps.

In accordance with one embodiment of the present invention, a method for optical coupling includes providing a holographic recording media 14 fixed relative to at least two optical elements 10, 12, 20; creating a hologram 40 by transmitting light from each of the at least two optical elements 10, 12, 20 to recording media 14; and transmitting light from a sending element 10 of the at least two optical elements through recording media 14 to a receiving element 12. Optimally light used in the context of the present invention includes temporally or spatially coherent light. Although additional optical devices (not shown) such as lenses or mirrors, for example, can be positioned between one or more of the optical elements and the recording media, such optical devices are not required.

In FIG. 1, the directional arrows of light beams 16 and 18 represent hologram creation, and the direction of either arrow in light beams 16 and 18, for example, would be reversed during optical coupling through the recording media. When two coherent light beams are transmitted to a recording media, a transmission-type hologram is formed which can be later used as the coupling element. Because of the special properties of holograms, light can thus be very effectively delivered between optical elements.

Typically the optical elements are selected from the group consisting of waveguides 10, optical fibers 12, optical devices 20 (FIG. 5), and combinations thereof. In a more specific embodiment, as shown in FIG. 1, one of the optical elements includes a waveguide 10 and another of the optical element includes an optical fiber 12. Useful optical fiber materials include optical glasses, polymers, and semiconductors, for example. Similarly, useful waveguide materials include optical glasses, polymers, and semiconductors, for example. Although specific embodiments are illustrated for purposes of example, the selection of the optical elements can be done in any desired manner.

FIG. 1 additionally illustrates an embodiment wherein recording media 14 is fixed between the two optical elements. As used herein "fixed" means that recording media 14 and at least a portion of each of optical elements 10 and 12 facing the recording media are mechanically positioned relative to one another in the same locations during both the recording and the reading phases of light transmission. The light elements and the recording media can be fixed in any appropriate manner. In one example the light elements and recording media are positioned on individual substrates (not shown) which are screwed or attached together. In the aforementioned example, the recording media may be situated on a substrate or may include a substrate. In another example, the light elements and recording media are positioned on a common substrate (not shown). In another example, a waveguide and recording media are situated on a substrate (not shown) and an optical fiber is attached to the substrate with a fiber pigtail (not shown).

FIG. 2 is a perspective view of another embodiment of the present invention wherein optical elements (shown as waveguide 10 and optical fiber 12 for purposes of example) are fixed on the same side of a thin film recording media. In this embodiment, it is useful to have the optical elements facing recording media 14 at any appropriate angle in a manner so as to result in overlap of the light beams 16 and 118 when writing and reading through the recording media. The arrows in the embodiment of FIG. 2 illustrate the direction of light when recording the hologram. When reading data from the hologram, one of arrows 16 and 118 will have a reversed direction. In FIGS. 1–2 as in all the figures, the directions of the arrows are merely for purposes of example and not intended to be limiting.

FIGS. 1–2 further illustrate an embodiment wherein the recording media includes a thin film media 14 as compared with FIGS. 3–4 which illustrate a volume media 114. Thin film media typically have thicknesses ranging from a few micrometers to about 100 micrometers whereas volume media typically have thicknesses ranging from about 1 millimeter to several centimeters. Volume media typically have higher diffraction efficiencies as compared with thin film media. Regardless of whether a thin film media or a volume media is selected, the embodiments of the present invention are useful for eliminating the need for complex and costly conventional coupling devices such as mirrors and lenses.

Recording media 14 may include any one of a number of various holographic materials. Several examples include plastic, glass, holographic films, polymers, semiconductors, and optical crystals. In some embodiments which provide additional design flexibility, photo-refractive material is used, for example, and activated by external electrical fields. Other nonlinear optical (NLO) materials such as thermal-optical, electrical-optical, acoustic-optical, intensity modifiable, and phase modifiable materials are also useful. Such NLO holograms are programmable and reconfigurable. Further options include polarization holograms which can be employed for applications such as polarization modulators or an optical isolator. Such dynamic holograms are particularly useful in embodiments such as FIG. 1 wherein the sending and receiving elements are situated on opposing sides of the recording media. Media for computer-generated holograms (CGHs) can also be used.

FIG. 5 is a side view of another embodiment of the present invention wherein an optical coupling system includes a substrate 24; a waveguide 10 supported by the substrate; an optical device 20 comprising an emitter or a detector; and a holographic recording media 214 supported by substrate 24 and positioned between waveguide 10 and the optical device 20. In one embodiment the substrate material includes ceramics, glasses, polymers, semiconductors, composite materials, or combinations thereof, for example.

In a more specific embodiment, as discussed above with respect to FIG. 1, the recording media is fixed with respect to the waveguide and optical device and includes a media fabricated by transmitting light from the waveguide and the optical device. In a still more specific embodiment, the optical device includes a vertical cavity surface emitting laser.

In an alternative embodiment wherein optical device 20 includes an optical detector, the recording media is typically recorded before being positioned between the waveguide and optical device.

In either embodiment, waveguide 10 typically is protected by cladding 26 and 28 and includes an angled mirror 22 situated at least partially overlying the recording media to provide a turn of the optical path. Any of the materials discussed above is useful as a recording media material in this embodiment.

FIG. 6 is a perspective view of another embodiment of the present invention which is similar to the embodiment of FIG. 2 with the addition of an optical detector 30 on the opposite side of the recording media. In this embodiment, while light is transmitted from sending element 10 through recording media 14 to receiving element 12, light is detected through the opposite side of the recording media. Such detection is possible because higher order images tend to leak through the opposite side of recording media 14. The detected light is monitored using a controller 42 (FIG. 11) for example. If desired, the transmission of light is then modified in response the in-situ optical coupling monitoring. Controller 42 may additionally or alternatively be configured for using the detected light to diagnose defects in the system. As one example, a lack of transmission may be indicative of power failure. As another example, the fact that the detected energy is too high or low may additionally be indicative of a problem with the coupling or with alignment. A feedback signal from the optical detector can actually control an external variable optical attenuator (VOA) or the source of signal light to adjust the coupling efficiency of the hologram for functions such as power equalization. Such in-situ monitoring is a useful feature which can be used independently or in combination of the embodiment wherein sending and receiving elements 10 and 12 are fixed relative to recording media 14. Controller 42 may include one or more digital processors, analog processors, or combinations thereof.

FIG. 7 is a perspective view of another embodiment of the present invention which is similar to the embodiment of FIG. 6 with the waveguide being replaced with an optical fiber 11 and with the additions of a beam splitter 34 and optical pumps 36 and 38 (which respectively provide "control beams" or "optical references").

In the embodiment of FIG. 7, a beam splitter is positioned relative to one of the sending and receiving elements, and transmitting light further includes transmitting at least one control beam to the beam splitter and the opposite side of the recording media.

In a more specific embodiment, as illustrated by FIG. 7, beam splitter 34 is situated relative to sending element 11, an optical signal is transmitted to beam splitter 34, and a control beam is transmitted to beam splitter 34 and the opposite side of recording media 14. In a more specific embodiment, a clock 44 (FIG. 11) is used for controlling the transmission of the control beam or beams.

In such embodiments, the hologram of the recording media is activated when the control beam is substantially simultaneously transmitted (via pumps 36 and 38, for example) to beam splitter 34 and recording media 14. Substantially simultaneous is meant to include either simultaneously or close enough in time such that the optical signal travels both through the hologram and through the beam splitter. In practice in embodiments wherein the beam splitter is positioned relative to the sending element, it may be useful to delay pump 38 to account for the period of time light travels between the beam splitter and the hologram. Conversely, in embodiments wherein the beam splitter is positioned relative to the receiving element, it may be useful to delay pump 36 to account for the period of time light travels between the hologram and the beam splitter. When there is no control beam being substantially simultaneously transmitted via optical pumps 36 and 38, the hologram of recording media 14 is not activated and light is not transmitted between sending and receiving elements 11 and 12. Therefore, light transmission is efficiently coupled or decoupled, and this configuration can be used as a simple optical switch.

Optical pumps 36 and 38 can be designed to operate in continuous wave (CW), pulse, pulse train, or wave forms. Beam splitter 34 may include a fiber coupler type splitter or a conventional splitter, for example.

Figure 8:
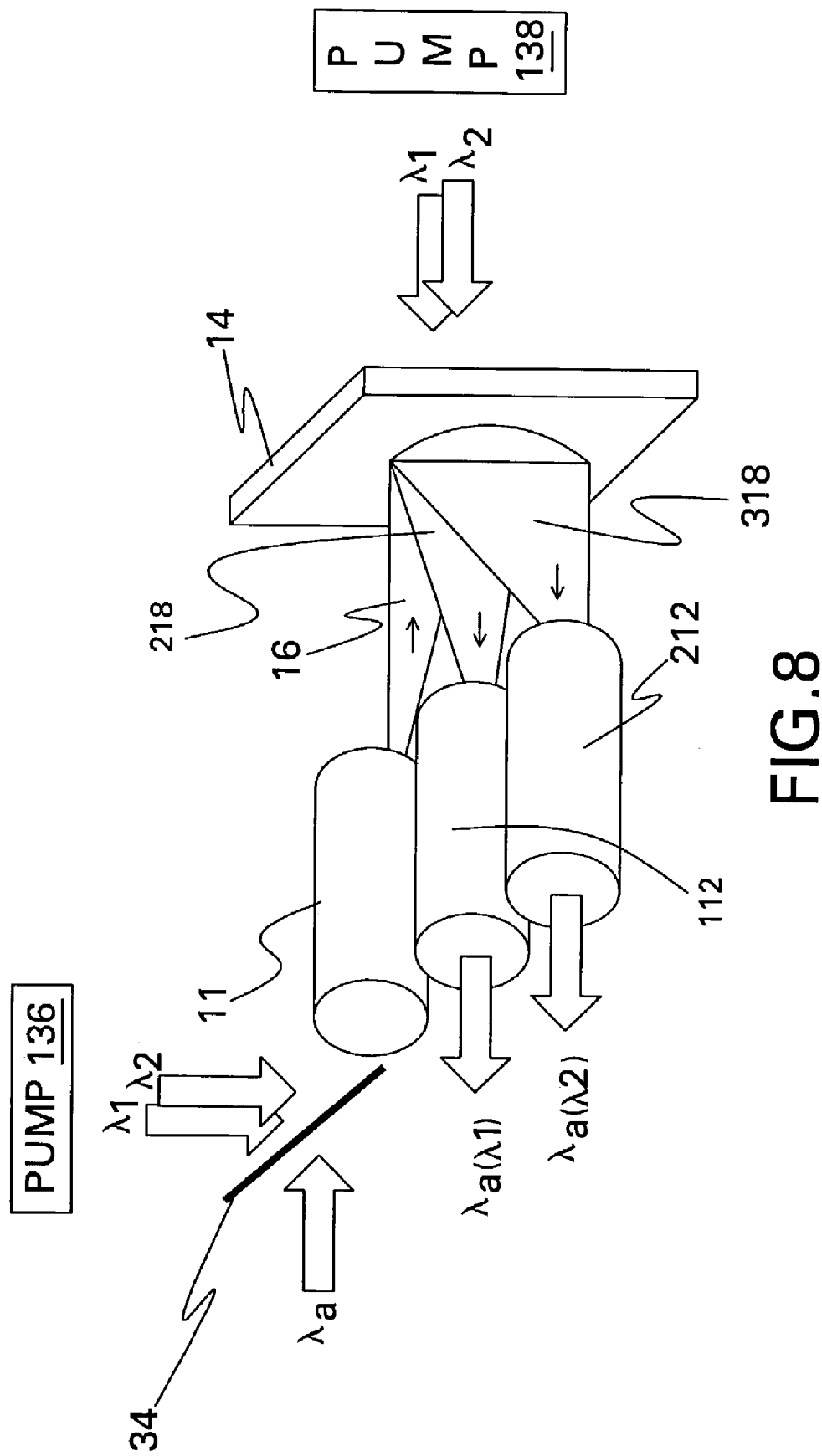
FIG. 8 is a perspective view of another embodiment of the present invention which is similar to the embodiment of FIG. 7 with the additions of a third optical fiber and a second control beam from the optical pumps.

FIG. 8 is a perspective view of another embodiment of the present invention which is similar to the embodiment of FIG. 7 with the additions of a third optical fiber 212 and a second control beam from the optical pumps. In this embodiment, the sending and receiving elements 11 and 112 include at least three optical elements 11, 112, and 212.

FIG. 8 is a perspective view of another embodiment of the present invention which is similar to the embodiment of FIG. 7 with the additions of a third optical fiber 212 and a second control beam from the optical pumps. In this embodiment, the sending and receiving elements 11 and 112 include at least three optical elements 11, 112, and 212.

In an alternative embodiment to the 1 by N multiplexing embodiment, in an N by 1 multiplexing embodiment the arrows are reversed and element 11 becomes the receiving element. In this embodiment, transmitting light through the recording media includes transmitting at least two control beams through at least two optical elements 112 and 212 to the opposite side of the recording media, and these control beams are additionally transmitted to beam splitter 34.

Figure 9:
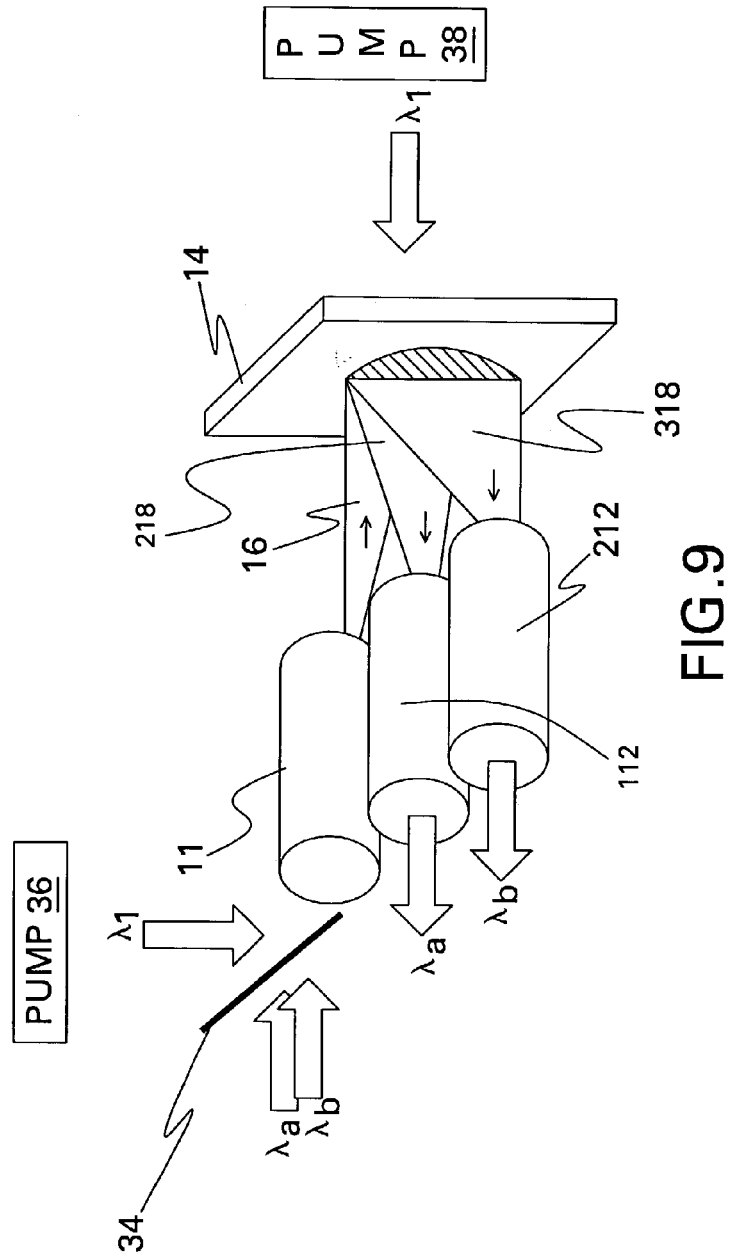
FIG. 9 is a perspective view of another embodiment of the present invention which is similar to the embodiment of FIG. 7 with the additions of a third optical fiber and a second optical signal.

FIG. 9 is a perspective view of another embodiment of the present invention which is similar to the embodiment of FIG. 7 with the additions of a third optical fiber and a second optical signal. In this embodiment, at least two optical signals are transmitted to the beam splitter when fiber 11 is the sending element or generated by the beam splitter when fiber 11 is the receiving element.

When optical fiber 11 includes a sending element, for example, if the optical signals have different wavelengths, the angle of reflection off recording media 14 will determine which of optical fibers 112 and 212 receives the light. Thus wavelength division multiplexing can be used to separate wavelengths from a single fiber. As described above, the routing can be performed separately, dynamically or simultaneously.

Figure 10:
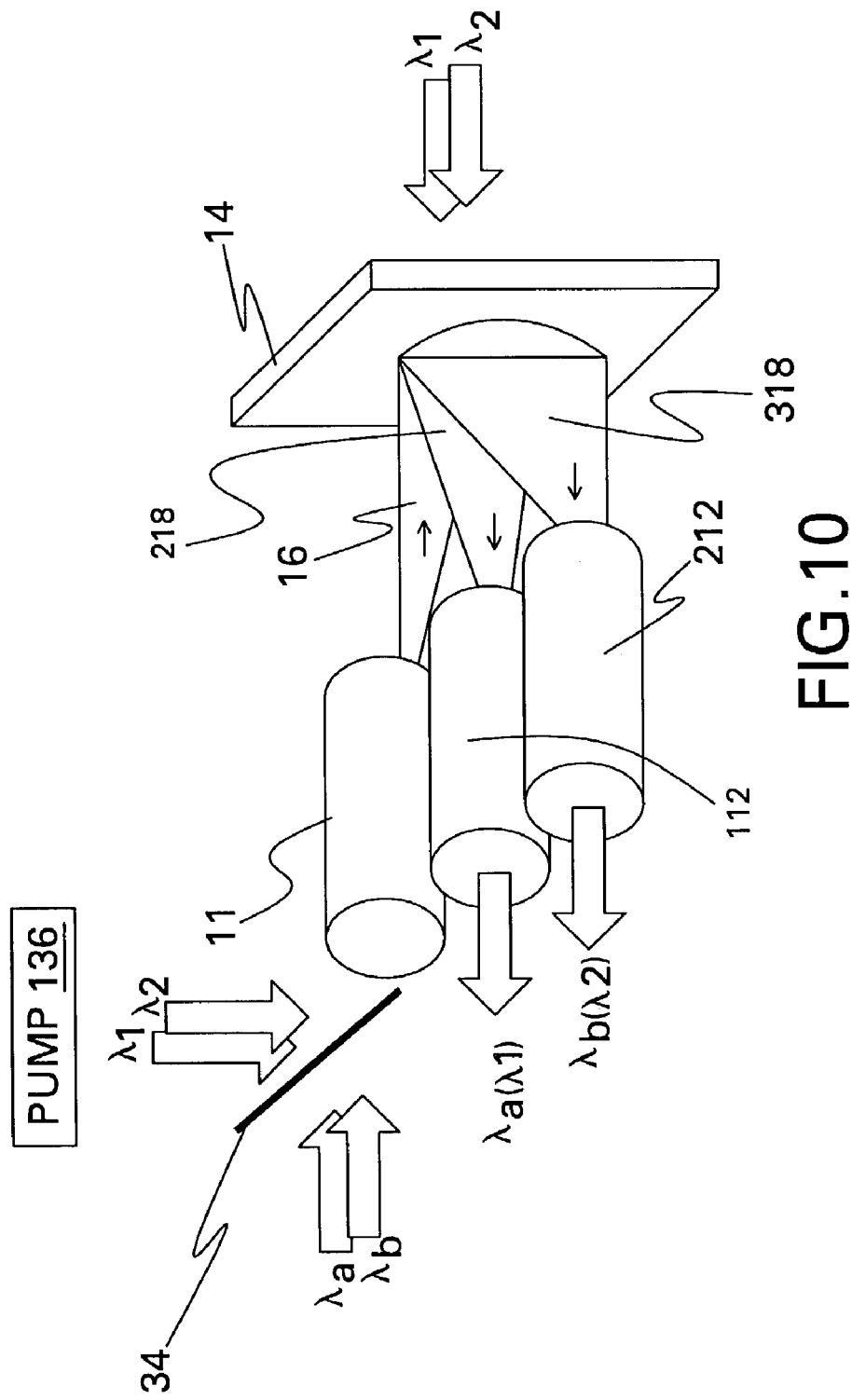
FIG. 10 is a perspective view of another embodiment of the present invention which is similar to the embodiment of FIG. 9 with the addition of a second control beam from the optical pumps.

FIG. 10 is a perspective view of another embodiment of the present invention which is similar to the embodiment of FIG. 9 with the addition of a second control beam from the optical pumps. In this embodiment, a combination and interaction among two optical signals and two control beams results. The mechanism of this switching and/or routing signals can be easily scaled up for many wavelengths, especially for wavelength-division multiplexing (WDM) or dense wavelength-division multiplexing (DWDM). The above described embodiments can further be expanded to encompass N by N multiplexing if beam splitting is provided relative to more than one optical element.

Figure 11:
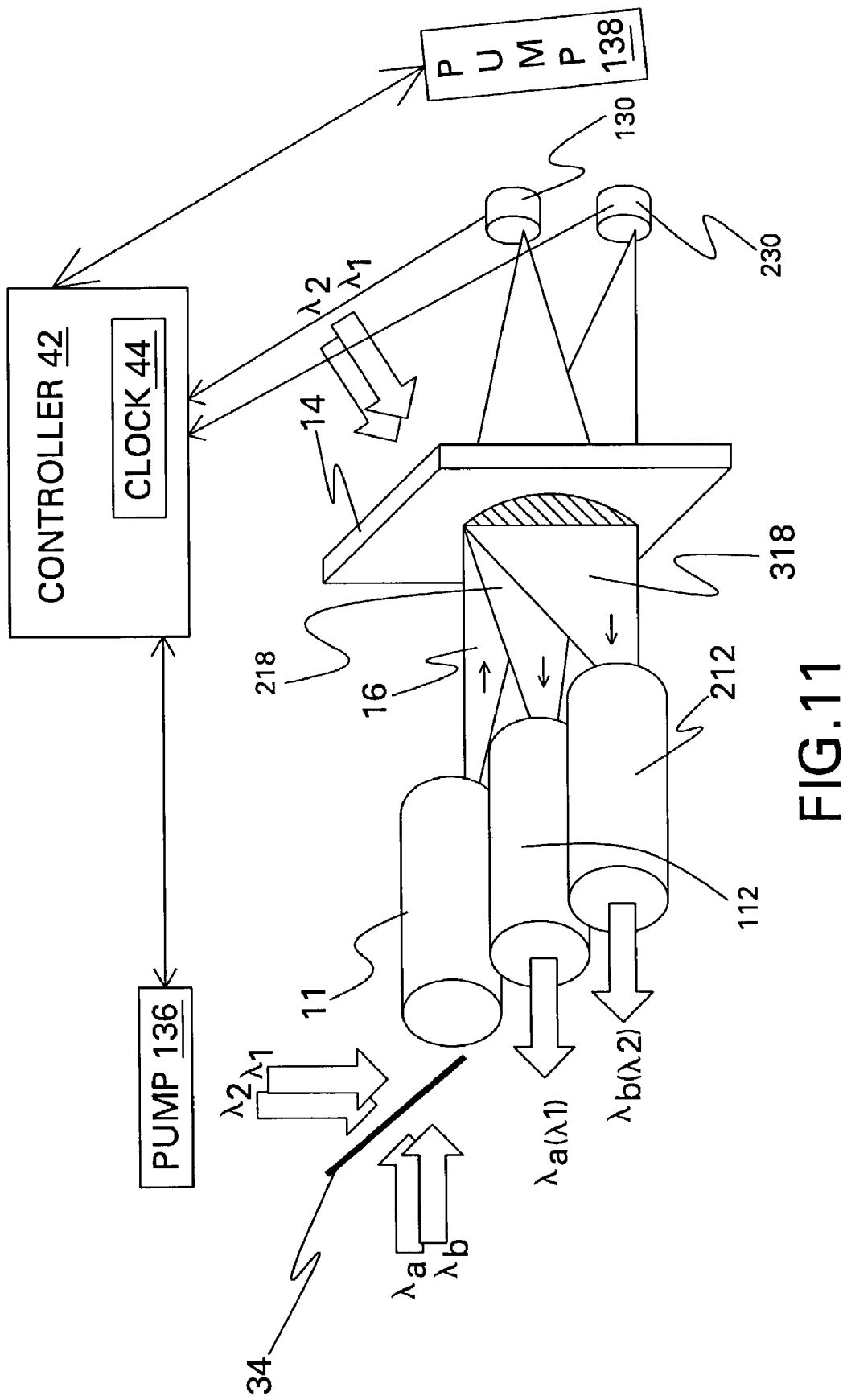
FIG. 11 is a perspective view of another embodiment of the present invention which is similar to the embodiment of FIG. 10 with the addition of an optical detector on the opposite side of the holographic recording media.

FIG. 11 is a perspective view of another embodiment of the present invention which is similar to the embodiment of FIG. 10 with the addition of optical detectors 130 and 230 on the opposite side of the recording media. As discussed above, controller 42 (including clock 44) can be used for monitoring and optical control.

Although the above embodiments have been described primarily in the context of a method, such embodiments are also applicable in the context of a system. For example, in accordance with one embodiment, an optical coupling system includes a holographic recording media 14 fixed relative to at least two optical elements 10, 12, 20, the recording media comprising a hologram fabricated by transmitting light from each of the at least two optical elements to the recording media.

Additionally, the various embodiments can be used in any desired combination. For example, in one embodiment, an optical coupling system includes a holographic recording media 14; at least two optical elements 10, 12, 20 situated on one side of the recording media; and an optical detector 30 situated on the opposite side of the recording media for detecting light transmitted through the opposite side of the recording media while light is transmitted from a sending element of the at least two optical elements through the recording media to a receiving element of the at least two optical elements and a controller 42 for monitoring the optical coupling using the detected light. As another example, in another embodiment, an optical coupling system includes a holographic recording media 14; at least three optical elements 10, 12, 20 situated on one side of the recording media; a beam splitter situated relative to one of the at least three optical elements; and optical pumps 36, 136 configured for transmitting a control beam to the beam splitter and the opposite side of the recording media so as to control transmission of an optical signal between the one of the at least three optical elements and the others of the at least three optical elements. Such embodiments are useful regardless of whether the optical elements are used to create a hologram in the recording media.

The previously described embodiments of the present invention have many advantages, including the provision of self-aligned procedure which minimizes potential misalignment between optical elements and resulting optical losses and can be used for effective light coupling, switching, routing, power-monitoring, self-diagnosis, or combinations thereof.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for optical coupling comprising:
   providing a holographic recording media fixed relative to at least two optical elements;
   creating a hologram by transmitting light from each of the at least two optical elements to the recording media; and
   transmitting light from a sending element of the at least two optical elements through the recording media to a receiving element of the at least two optical elements,
   wherein the at least two optical elements are fixed relative to one another and to the holographic recording media during both recording and reading phases of light transmission.

2. The method of claim 1 wherein the sending and receiving elements are selected from the group consisting of waveguides, optical fibers, optical devices, and combinations thereof.

3. The method of claim 2 wherein the sending and receiving elements comprise a waveguide and an optical emitter.

4. The method of claim 3 wherein the optical emitter comprises a vertical cavity surface emitting laser.

5. The method of claim 2 wherein the sending and receiving elements comprise a waveguide and an optical fiber.

6. The method of claim 1 wherein the recording media is selected from the group consisting of thin film media and volume media.

7. The method of claim 1 wherein providing the recording media fixed relative to the sending and receiving elements comprises providing a recording media fixed between the sending and receiving elements.

8. The method of claim 1 wherein providing the recording media fixed relative to the sending and receiving elements comprises providing a recording media fixed with the sending and receiving elements situated on one side of the recording media.

9. The method of claim 8 further comprising, while transmitting light from the sending element through the recording media to the receiving element, detecting light transmitted through the opposite side of the recording media, and monitoring the optical coupling using the detected light.

10. The method of claim 1 wherein the recording media comprises at least one of a non-linear optical material and a polarization material.

11. An optical coupling system comprising:
    a holographic recording media fixed relative to at least two optical elements, the recording media comprising a hologram fabricated by transmitting light from each of the at least two optical elements to the recording media, wherein the at least two optical elements are fixed relative to one another and to the holographic recording media during both recording and reading phases of light transmission.

12. The system of claim 11 wherein the at least two optical elements are selected from the group consisting of waveguides, optical fibers, optical devices, and combinations thereof.

13. The system of claim 12 wherein the at least two optical elements comprise a waveguide and an optical emitter.

14. The system of claim 13 wherein the optical emitter comprises a vertical cavity surface emitting laser.

15. The system of claim 14 further comprising a substrate supporting the recording media and wherein the waveguide comprises an angled mirror situated at least partially overlying the recording media.

16. The system of claim 12 wherein the at least two optical elements comprise a waveguide and an optical fiber.

17. The system of claim 11 wherein the recording media is selected from the group consisting of thin film media and volume media.

18. The system of claim 11 wherein the recording media is fixed between the at least two optical elements.

19. The system of claim 11 wherein the recording media is fixed with the at least two optical elements situated on one side of the recording media.

20. The system of claim 19 further comprising, an optical detector situated on the opposite side of the recording media for detecting light transmitted through the opposite side of the recording media while light is transmitted from a sending element of the at least two optical elements through the recording media to a receiving element of the at least two optical elements and a controller configured for monitoring the optical coupling using the detected light and modifying the transmission of light in response the optical coupling monitoring.

21. The system of claim 19 further comprising, an optical detector situated on the opposite side of the recording media for detecting light transmitted through the opposite side of the recording media while light is transmitted from a sending element of the at least two optical elements through the recording media to a receiving element of the at least two optical elements and a controller configured for using the detected light to diagnose defects in the system.

22. The system of claim 11 wherein the recording media comprises at least one of a non-linear optical material and a polarization material.

23. An optical coupling system comprising:
    a substrate;
    a waveguide supported by the substrate;
    an optical device comprising an emitter or a detector; and
    a holographic recording media supported by the substrate and positioned between the waveguide and the optical device, wherein the waveguide and the optical device are fixed with respect to one another and to the holographic recording media during both recording and reading phases of light transmission.

24. The system of claim 23 wherein the optical device comprises a vertical cavity surface emitting laser.

25. The system of claim 23 wherein the waveguide comprises an angled mirror situated at least partially overlying the recording media.

26. The system of claim 23 wherein the recording media is selected from the group consisting of thin film media and volume media.

27. The system of claim 23 wherein the recording media comprises at least one of a non-linear optical material and a polarization material.

28. An optical coupling system comprising:
- a holographic recording media;
- at least two optical elements situated on one side of the recording media, wherein said at least two optical elements are fixed with respect to one another and to the recording media during both recording and reading phases of light transmission; and
- an optical detector situated on the opposite side of the recording media for detecting light transmitted through the opposite side of the recording media while light is transmitted from a sending element of the at least two optical elements through the recording media to a receiving element of the at least two optical elements and a controller for monitoring the optical coupling using the detected light.

29. The system of claim 28 wherein the controller is configured for modifying the transmission of light in response the optical coupling monitoring.

30. The system of claim 28 wherein the controller is configured for using the detected light to diagnose defects in the system.

* * * * *